United States Patent
Schmitt et al.

(10) Patent No.: US 6,860,687 B1
(45) Date of Patent: Mar. 1, 2005

(54) WELDABLE ALUMINUM STUD

(75) Inventors: Klaus G. Schmitt, Giessen (DE); Michael Krengel, Giessen (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 09/830,721

(22) PCT Filed: Dec. 7, 1999

(86) PCT No.: PCT/US99/28950

§ 371 (c)(1),
(2), (4) Date: Apr. 30, 2001

(87) PCT Pub. No.: WO00/34672

PCT Pub. Date: Jun. 15, 2000

(30) Foreign Application Priority Data

Dec. 8, 1998 (DE) .......................... 198 56 613

(51) Int. Cl.⁷ ............................ F16B 37/06; B23K 9/20
(52) U.S. Cl. ....................... 411/171; 411/901; 411/914; 219/98; 219/99; 148/247
(58) Field of Search ................................ 411/171, 901, 411/914; 219/98, 99; 148/247

(56) References Cited

U.S. PATENT DOCUMENTS

| | | | | |
|---|---|---|---|---|
| 2,413,370 A | * | 12/1946 | Palmer | |
| 2,491,479 A | * | 12/1949 | Dash | |
| 2,670,424 A | * | 2/1954 | Martin | |
| 2,858,414 A | * | 10/1958 | Dash | |
| 3,481,634 A | * | 12/1969 | Rondeau | |
| 4,326,894 A | * | 4/1982 | Konnert | |
| 4,684,304 A | * | 8/1987 | Franks | |
| 5,391,238 A | * | 2/1995 | Reichgott | |
| 5,584,946 A | * | 12/1996 | Karmaschek | |
| 5,618,491 A | * | 4/1997 | Kurup et al. | |
| 5,685,680 A | * | 11/1997 | Duffy | |
| 5,728,233 A | * | 3/1998 | Ikeda | |

* cited by examiner

Primary Examiner—Flemming Saether
(74) Attorney, Agent, or Firm—Edward D. Murphy

(57) ABSTRACT

A weld-on part made of aluminum or an aluminum alloy, such as but not limited to a stud (1), which has a surface which is at least partially provided with a layer (5) which contains a titanium containing material. The stud (1) is treated with a chrome-free passivating solution which imparts corrosion resistance while simultaneously causing a layer (5) of titanium containing material to be formed on at least a portion of the surface of the stud (1). The layer (5) of titanium containing material permits the stud (1) to be satisfactorily welded to a surface, without the occurrence of arc jumping or blowing, in part, by lowering contact resistance during the welding process.

15 Claims, 1 Drawing Sheet

WELDABLE ALUMINUM STUD

FIELD OF THE INVENTION

The invention relates generally to weldable materials and more particularly to weldable aluminum or aluminum alloy studs having a titanium containing material on at least a portion of a surface thereof, and methods of making the same.

BACKGROUND OF THE INVENTION

Weldon parts are used in many areas of industrial manufacture. They enable metal connections without making holes and form a link between a basic structure and a component which is to be fastened. For example, a go weld stud can serve to fasten pipe conduits, push buttons, plastic nuts or cable clips. Weld-on parts (e.g., studs) made of aluminum or aluminum alloys are known which can be welded to a basic part (e.g., a piece of sheet metal) which is also made of aluminum or aluminum alloys.

Under normal circumstances, freshly exposed aluminum in the presence of air immediately begins to oxidize. The oxide generally forms a layer over the entire surface and continues to grow thicker with the passage of time. The oxide layer is hard, adhesive, transparent, and up to several nanometers thick. In addition, in many circumstances, the thickness of the oxide layer may vary from spot to spot. The oxide layer is largely insoluble in a pH range between 4.5 and 8.5. Thus, the oxide layer provides the part with protection against corrosion. However, the oxide layer does, in some circumstances, adversely affect further processing steps to which the welded part may be subjected.

While this condition applies equally to sheet aluminum and to aluminum studs, the process of manufacturing aluminum studs by cold working the metal makes the condition even worse because, after cold working, the surface may be comprised of areas of freshly exposed aluminum interspersed with different areas having varying oxide layer thicknesses. Thus, in the finished stud, the thickness of the oxide layer is random and variable.

This condition causes problems during the welding of the studs to aluminum sheets because the energy required to release electrons from the oxide is lower than the energy to release electrons from bare aluminum. For example, in arc welding a stud, the arc may initiate at the center point of a rounded weld head but, after some initial melting, the arc might jump or "blow" to an adjacent region, such as an area having a thick oxide layer. If this adjacent region is seriously off-center, the result may be an unsatisfactory weld.

Therefore, there exists a need for aluminum studs that have a relatively consistent oxide layer which is capable of being satisfactorily welded to a surface, without the occurrence of arc jumping or blowing. There also exists a need for methods of producing such aluminum studs.

SUMMARY OF THE INVENTION

It accordingly is an object of the present invention to provide an aluminum stud that has improved weldability.

It is another object of the present invention to provide an aluminum stud having a titanium containing material on at least a portion of a surface thereof.

It is another object of the present invention to provide a method for producing an aluminum stud that has improved weldability.

It is another object of the present invention to provide a method for producing an aluminum stud having a titanium material on at least a portion of a surface thereof.

In order to overcome the aforementioned disadvantages and achieve many of the aforementioned objects, the present invention provides a weldable part comprised of aluminum or an aluminum alloy, wherein the part has a titanium containing material on at least a portion of a surface thereof, wherein the layer of titanium containing material lowers contact resistance during a welding procedure.

The present invention also provides a method of forming a titanium containing material on at least a portion of at least one surface of a weldable part of aluminum or an aluminum alloy. The method includes the steps of: (1) providing a solution of titanium containing materials, and (2) contacting the part with the solution for a sufficient period of time to permit the titanium containing material to be applied to the part; wherein the layer of titanium containing material lowers contact resistance during a welding procedure.

A more complete appreciation of the present invention and its scope can be obtained from an understanding the accompanying drawings, which are briefly summarized below, the followed detailed description of the invention, and the appended claims.

BRIEF DESCRIPTION OF THE DRAWINGS

The same reference numerals refer to the same parts throughout the various Figures.

DETAILED DESCRIPTION OF THE INVENTION

Initially, the weld-on part is pre-treated via known etching techniques to strip away aluminum oxides and thereby expose an aluminum or aluminum alloy surface. The titanium containing material is formed upon exposed aluminum or aluminum alloy portion of the weld-on part by immersing the part in an acidic solution including a concentration of titanium ions and, preferably, a chromium free acidic solution containing titanium ions. By way of non-limiting example, one suitable acidic solution believed to contain a sufficient quantity of titanium ions, initially or through sequential addition during the application step, is known as ALODINE® 2040, which is commercially available from Henkel Surface Technologies (Madison Heights, Mich.). The acidic solution utilized should provide a caustic passivation for the aluminum surface to be treated.

To prepare an ALODINE 2040 solution for use in accordance with the teachings of the present invention, 10–30 liters (preferably 15–20 liters) of the commercially available solution is mixed with a sufficient quantity of demineralized water to form a 1000 liter bath. At the above described ratio, the resulting bath should have a pH value of 1.25.

Figure 1:
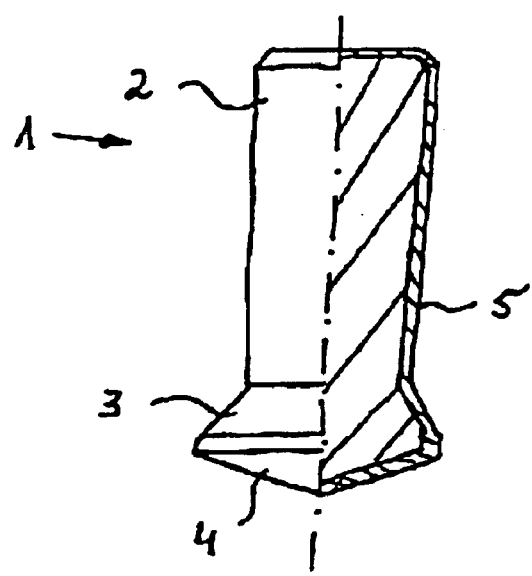
FIG. 1 is a partial cross-sectional view of a weld stud, in accordance with one aspect of the present invention.
Figure 2:
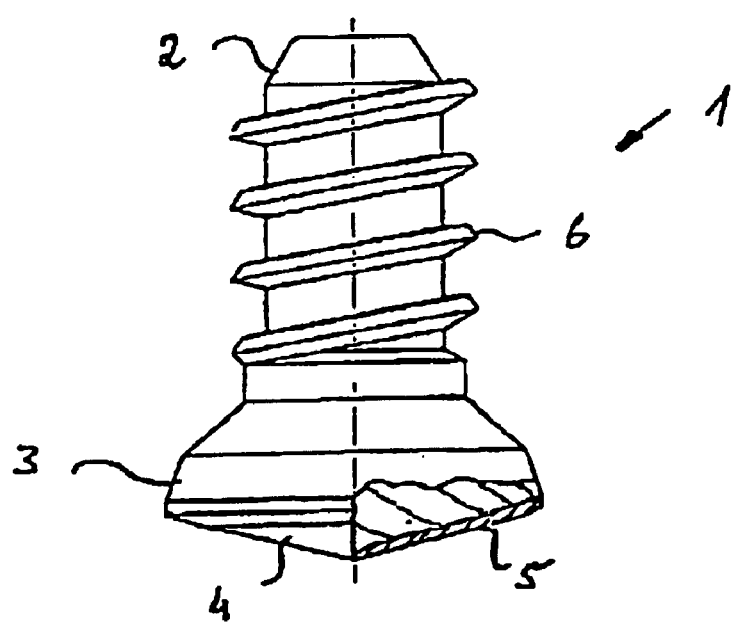
FIG. 2 shows an elevational view of a weld stud having a threaded portion, in accordance with one aspect of the present invention.

As noted above, the weld-on part is preferably a weld stud such as that shown in FIGS. 1 and 2, made of aluminum or an aluminum alloy. The weld stud 1 has a shank 2 and a head 3 extending along one end of the shank. Preferably the head 3 has a conically tapered portion which forms a welding face 4.

To provide the weld-on part with a titanium containing material, the weld-on part is dipped or otherwise coated at a temperature of about 45° C. in the acidic solution containing titanium ions. The treatment time, particularly if the part is dipped, is generally between 30–90 seconds, wherein the solution should have a free acid count of between about 6.1 to 18.3. Thus, as should be understood by those skilled in the art, the acidic solution is controlled by the determination of the free acid count as well as via a measure of the dissolved aluminum. For each 1.0 decrease in the free acid count, additional solution should be added to the bath.

Once at least the welding face of the weld stud is provided with the titanium containing material, contact resistance between the weld-on part, a pin and the supporting structure or substrate is reduced. Providing the layer in the region of the welding face has a positive influence on the welding process. In particular, a qualitatively high grade welded connection is achieved, enabling the energy required to weld the pin to be reduced.

It is also preferred that the titanium containing material be of a sufficient thickness to prevent the formation of aluminum oxide on the weld-on part. As noted above, the thickness should be on the order of several nanometers.

Without being bound to a particular theory of the operation of the present invention, it is believed that the ALODINE 2040 causes a relatively thin and uniform thickness layer of titanium aluminum oxide crystals to be formed on the surface of the weld-on part. Although the titanium aluminum oxide layer may grow with time, which is generally undesirable, the rate of growth is much lower than for non-passivated aluminum, and the thickness of the titanium aluminum oxide layer remains relatively consistent.

The weld stud 1 is generally connected by means of arc welding to a structure or substrate (not shown) such as a sheet of a desired thickness. For example, the weld studs may be adhered to sheets as thin as 0.8 mm on average. Preferably, the sheet will also be made of aluminum or an aluminum alloy. By way of non-limiting example, the sheet structure may be an autobody panel for a motor vehicle.

Referring to FIG. 2, there is shown a second embodiment of a weld stud 1 having a shank 2. However, in this embodiment, a Christmas-tree shaped thread 6 is formed on the shank 2. A welding head 3 is formed at a free end of the shank 2. The welding head 3 has a welding face 4, which comes into contact during arc welding with a substrate (not shown), such as an aluminum or aluminum alloy piece of sheet metal. The welding face 4 is provided with a layer 5 of a titanium containing material.

The foregoing description is considered illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

What is claimed is:

1. A method for attaching an aluminum weld stud to a substrate, the stud comprising a shank and a head extending along one end of the shank, the method comprising arc welding the head of the stud to the substrate, wherein the stud head comprises aluminum or an aluminum alloy and has a separate layer of a titanium containing material different from the stud head formed on at least a portion of a surface of the head.

2. A method according to claim 1, wherein the titanium containing material is applied to the surface of the stud head by immersing in an acidic solution comprising titanium ions.

3. A method according to claim 2, wherein the acidic solution is chromium free.

4. A method according to claim 2, wherein the acidic solution has a free acid content of between 6.1 and 18.3.

5. A method according to claim 1, wherein the substrate comprises a sheet material.

6. A method according to claim 5, wherein the sheet material comprises aluminum or an aluminum alloy.

7. A method according to claim 5, wherein the sheet material comprises an auto body panel for a motor vehicle.

8. A method for welding an aluminum weld stud to an auto body panel made of aluminum comprising;

providing at least the surface of the stud to be welded with a separate layer of a titanium containing material different from the stud surface, and arc welding the stud to the panel.

9. A method according to claim 8, wherein providing at least the surface of the stud with a titanium containing metal comprises coating the surface in an acidic solution containing titanium ions.

10. A method according to claim 1, wherein the solution has a free acid content to between 6.1 and 18.3.

11. A method according to claim 10, wherein the acidic solution is at about 45° C.

12. A method according to claim 9, comprising the solution for 30 to 90 seconds.

13. A method according to claim 9, wherein the acid solution is chromium free.

14. A method according to claim 9, wherein the acidic solution comprises ALODINE® 2040.

15. A method according to claim 8, wherein the layer is of sufficient thickness to prevent the formation of aluminum oxide.

* * * * *